US009574925B2

(12) United States Patent
Asano et al.

(10) Patent No.: US 9,574,925 B2
(45) Date of Patent: Feb. 21, 2017

(54) FLUID MEASUREMENT DEVICE HAVING A CIRCUIT FOR PRECISE FLOW MEASUREMENT

(75) Inventors: Satoshi Asano, Tokyo (JP); Masahiro Matsumoto, Tokyo (JP); Hiroshi Nakano, Tokyo (JP); Keiji Hanzawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 111 days.

(21) Appl. No.: 14/411,346

(22) PCT Filed: Jun. 27, 2012

(86) PCT No.: PCT/JP2012/066317
§ 371 (c)(1),
(2), (4) Date: Dec. 24, 2014

(87) PCT Pub. No.: WO2014/002198
PCT Pub. Date: Jan. 3, 2014

(65) Prior Publication Data
US 2015/0377676 A1    Dec. 31, 2015

(51) Int. Cl.
*G01F 1/68* (2006.01)
*G01F 15/02* (2006.01)
*G01F 1/684* (2006.01)
*G01F 1/696* (2006.01)
*G01F 5/00* (2006.01)

(52) U.S. Cl.
CPC ............. *G01F 15/02* (2013.01); *G01F 1/68* (2013.01); *G01F 1/684* (2013.01); *G01F 1/696* (2013.01); *G01F 5/00* (2013.01)

(58) Field of Classification Search
None
See application file for complete search history.

(56) References Cited

U.S. PATENT DOCUMENTS 6,517,508 B1 *   2/2003   Utterberg ............ A61M 1/3621
                                                     604/4.01

FOREIGN PATENT DOCUMENTS

| JP | 53-31160 A | 3/1978 |
| JP | 10-38657 A | 2/1998 |
| JP | 2001-241990 A | 9/2001 |
| JP | 2004-93174 A | 3/2004 |
| JP | 4269046 B2 | 5/2009 |

OTHER PUBLICATIONS

International Search Report (PCT/ISA/210) dated Oct. 2, 2012 with English-language translation (Eight (8) pages).

* cited by examiner

*Primary Examiner* — Harshad R Patel
(74) *Attorney, Agent, or Firm* — Crowell & Moring LLP

(57) ABSTRACT

A fluid measurement device includes a circuit unit into which a first signal output from a first detection element and a second signal output from a second detection element are input. The circuit unit includes a signal processing part, a state deciding part, and a controller. The controller controls an amount of change that a change of the first signal imparts to the third signal in accordance with a result of decision by the state deciding part that determines that the state of the first signal is not within the predetermined range. The predetermined range is based on the second signal.

11 Claims, 7 Drawing Sheets

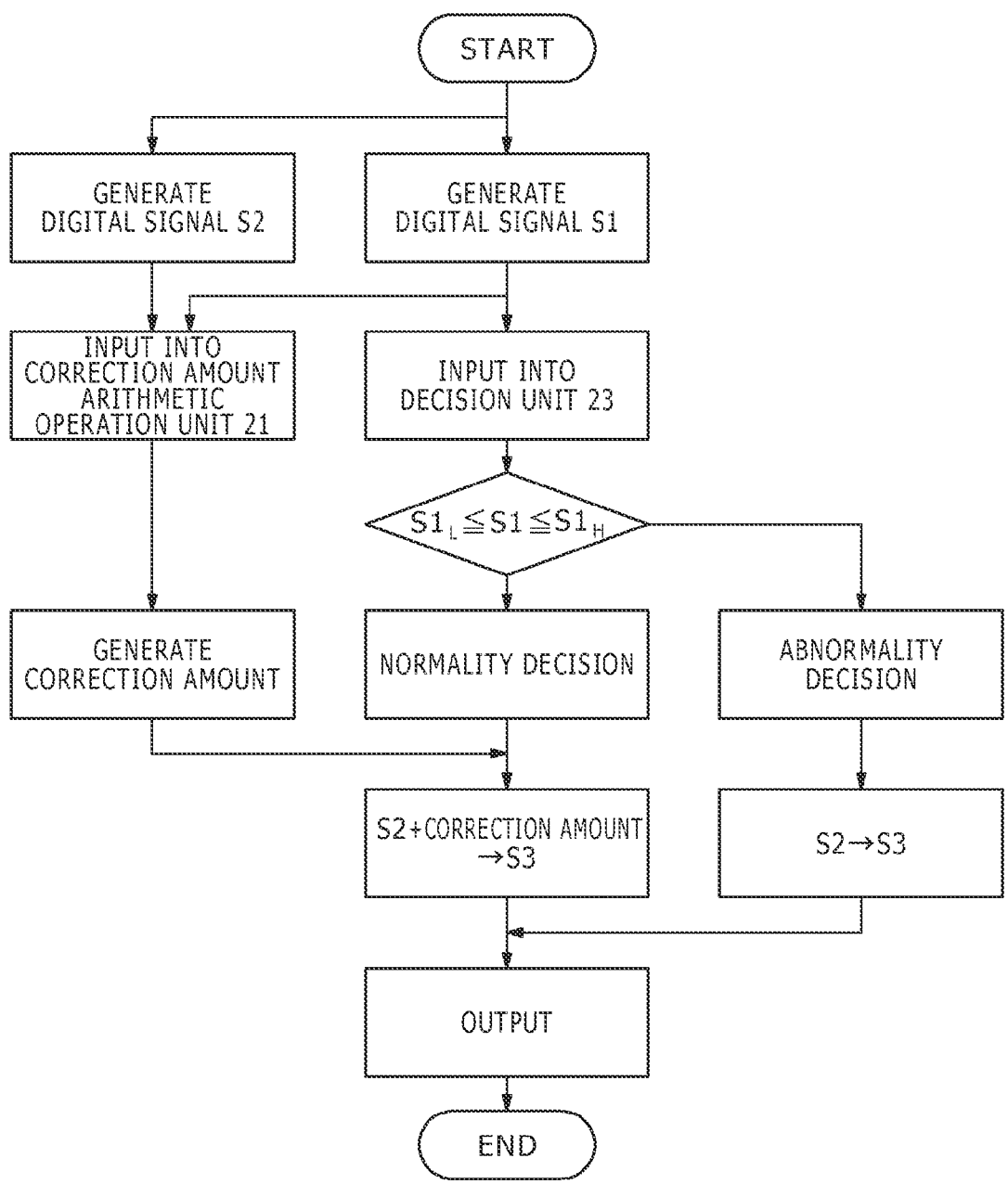

FLUID MEASUREMENT DEVICE HAVING A CIRCUIT FOR PRECISE FLOW MEASUREMENT

TECHNICAL FIELD

The present invention relates to a fluid measurement device adapted to measure at least one fluid parameter.

BACKGROUND ART

In order to reduce future environmental loads on automobiles, a combustion control technique for making it possible to highly control generation of a toxic substance in in-cylinder combustion of an engine is needed. Therefore, it is necessary to accurately grasp an amount of suction air into the engine, and higher precision is being desired in a fluid measurement device that is represented by a flow sensor.

As the fluid measurement device for automobile, a thermal type flow sensor is known. The thermal type flow sensor is a device in which a heating element is arranged in a fluid and a flow rate is measured by detecting a change in temperature around the heating element caused by a flow. It is known that the output characteristic of this thermal type flow sensor fluctuates in accordance with the temperature, the pressure and so forth of the fluid, and correction techniques according to the temperature, the pressure and so forth have been proposed so far. There is a technique disclosed, for example, by Patent Literature 1.

The thermal type flow sensor described in Patent Literature 1 has a temperature detection unit that obtains a temperature t of a fluid that flows through a passage in order to correct a detected parameter v, and correction means that is provided with a correction table that has stored a correction value $\Delta X$ (v, t) per unit temperature relevant to the detected parameter v and the fluid temperature t and corrects the parameter v to a flow rate at a reference temperature $t_\theta$ by setting a flow rate V after corrected as $$V=v+\Delta X(v,t)\cdot(t-t_\theta)$$

in accordance with v and t and $\Delta X$ (v, t).

In addition, the same also applies to pressure correction, and it has a pressure detection unit that obtains a pressure p of the fluid that flows through the passage in order to correct the detected parameter v, and correction means that is provided with a correction table that has stored a correction value $\Delta Y$ (v, p) per unit temperature relevant to the detected parameter v and the fluid pressure p and corrects the parameter v to a flow rate at a reference pressure $p_\theta$ by setting the flow rate V after corrected as $$V=v+\Delta Y(v,p)\cdot(p-p_\theta)$$

in accordance with v and p and $\Delta Y$ (v, p).

CITATION LIST

Patent Literature

Patent Literature: Japanese Patent No. 4269046

SUMMARY OF INVENTION

Technical Problem

Incidentally, the thermal type flow sensor described in Patent Literature has a configuration that detected values that are used for correcting the flow rate value and are detected by the temperature detection unit and the pressure detection unit directly exert influence on the flow rate value after correction. Accordingly, in the case of the thermal type flow sensor that has used the correction technique described in Patent Literature 1, it is important to grasp whether a parameter (hereinafter, referred to as a "correction parameter") used for correction is highly reliable information, and it becomes important to grasp whether measuring means that measures the correction parameter is normally measuring the correction parameter.

That is, in a case where the correction parameter had a value that is different from that in a normal period, it means that over-correction processing is performed by using a value that is different from the original correction parameter. Thus, the flow rate value to be detected becomes a value including an error caused by the over-correction processing and such a problem occurs that measurement precision is lowered. However, nothing is considered for the abovementioned problem in Patent Literature 1.

An object of the present invention is to provide a fluid measurement device that is high in measurement precision.

Solution to Problem

In order to solve the abovementioned problem, the fluid measurement device of the present invention is a fluid measurement device that has a circuit unit into which a first signal output from a first detection element and a second signal output from a second detection element are input, wherein the circuit unit includes signal processing means that outputs a third signal in accordance with the first signal and the second signal, state deciding means that decides a state of the first signal, and control means that controls an amount of change that a change of the first signal imparts to the third signal in accordance with a result of decision by the state deciding means.

Advantageous Effects of Invention

According to the present invention, the fluid measurement device that is high in measurement precision can be obtained.

BRIEF DESCRIPTION OF DRAWINGS

FIG. 14 is a flowchart of the fluid measurement device that constitutes the first embodiment.

DESCRIPTION OF EMBODIMENTS

Figure 1:
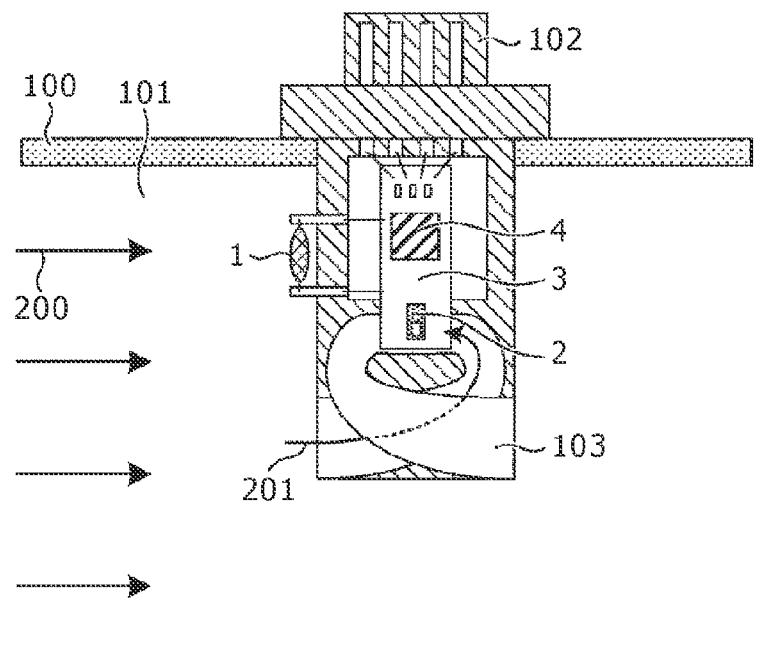
FIG. 1 is a schematic structure of a fluid measurement device.

In the following, a first embodiment that is one embodiment of the present invention will be described by using FIG. 1, FIG. 2, FIG. 10, FIG. 11 and FIG. 14.

First, a general structure of a fluid measurement device will be described by using FIG. 1.

A main fluid 200 can flow through within a main passage 101 formed by piping 100, and a casing 102 is inserted into the main passage 101 in order to measure a flow rate of this main fluid 200. The casing 102 is provided with a temperature sensor 1 and is attached to the main passage 101 such that the temperature sensor 1 is exposed to the main fluid 200. In addition, the casing 102 is provided with a sub-passage 103 into which part of the main fluid 200 can be introduced. In the sub-passage 103, a flow sensor 2 is arranged so as to be exposed to a tributary fluid 201 that has been introduced into it. The flow sensor 2 is supported by a support 3 and also a circuit element 4 is loaded on the support 3. The circuit element 4 plays a role of converting an output signal from the flow sensor 2 into flow rate information and outputting it to external equipment.

Figure 2:
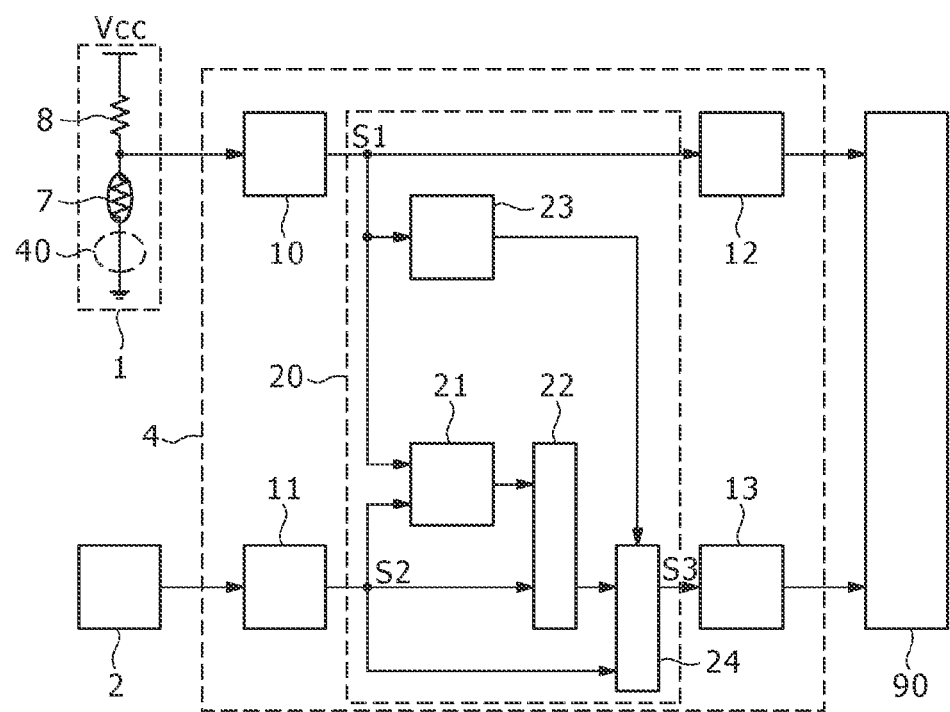
FIG. 2 is a circuit block of a fluid measurement device that constitutes a first embodiment.

Next, a detection circuit block of the fluid measurement device that constitutes the first embodiment is shown FIG. 2.

The other end of a thermistor 7 that has been grounded at one end thereof and one end of a fixed resistor 8 are connected together and the other end of the fixed resistor 8 is connected to a predetermined voltage Vcc. An analog signal of a midpoint potential of the thermistor 7 and the fixed resistor 3 is input into the circuit element 4 and the analog signal of the midpoint potential is converted into a digital signal S1 by an AD converter 10 that has been provided on the circuit element 4. Also, an analog signal output from the flow sensor 2 is input into the circuit element 4 and is converted into a digital signal S2 by an AD converter 11 that has been provided on the circuit element 4 similarly. Next, S1 and S2 are input into a digital signal processor 20 (hereinafter, referred to as DSP 20), are converted into analog signals by using CA converters 12 and 13 after they are subjected to predetermined digital arithmetic processing and are output to an electronic control unit 90 (hereinafter, referred to as an ECU 90) that is a host system.

Incidentally, the DSP 20 is provided with a correction amount arithmetic operation unit 21 that determines a correction amount for correcting S2 and determines the correction amount on the basis of S1 and S2. This correction amount is added to S2 by an addition unit 22.

The fluid measurement device that constitutes the first embodiment is characterized in that a decision unit 23 that decides abnormality of S1 and a switch 24 that selects either an output from the addition unit 22 or S2 and inputs it into the DA converter 13 as a digital signal S3 have been added, in addition to the abovementioned configurations. In the following, operations of the decision unit 23 and the switch 24 will be explained.

The temperature sensor 1 of the fluid measurement device in the first embodiment is arranged in the main passage 101 as shown in FIG. 1 and is in a state of being directly exposed to the main fluid 200. Therefore, it is feared that foreign substances such as dust and oil contained in the main fluid 200 may collide with or adhere to the temperature sensor 1 and temperature detection precision of the temperature sensor 1 may be lowered. For example, in a case where wiring 40 that grounds the thermistor 7 as shown in FIG. 2 has been disconnected due to collision of the foreign substance and so forth with it the midpoint potential of the thermistor 7 and the fixed resistor 8 is changed to Vcc. Since a change in midpoint potential is reflected on S1, the decision unit 23 can detect the change of S1 and diagnose it as abnormality.

Figure 10:
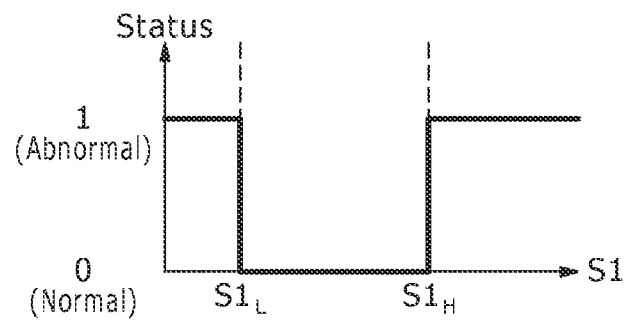
FIG. 10 is a conceptual diagram of a deciding method of a decision unit 23 of the flow measurement device that constitutes the first embodiment.

An abnormality decision method by the decision unit 23 in the first embodiment will be described by using FIG. 10. The decision unit 23 can be implemented by using, for example, a window comparator and the decision unit 23 in the first embodiment outputs 0 (normal) in a case where S1 is within a predetermined range $S1_L$ to $S1_H$ and outputs 1 (abnormal) in a case where it deviates from the abovementioned predetermined range as shown in FIG. 10.

Figure 11:
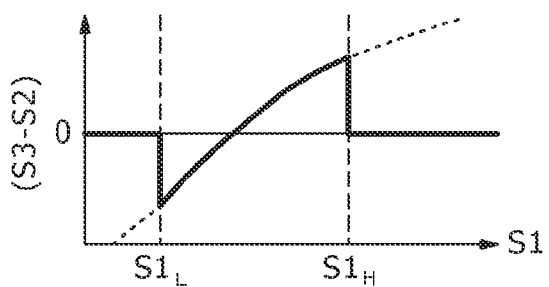
FIG. 11 is a relationship diagram of S1 with (S3−S2) of the fluid measurement device that constitutes the first embodiment.

Next, advantageous effects brought about by the switch 24 will be described by using FIG. 11. The switch 24 can connect the content of S3 selectively to either the output value of the addition unit 22 or S2 in accordance with a result of decision by the decision unit 23, and in has been made such that S2 serves as S3 out of the abovementioned predetermined range $S1_L$ to $S1_H$ in the first embodiment. Accordingly, while the predetermined correction amount according to the change of S1 is added to S2 to generate S3 within the abovementioned predetermined range, the influence of the change of S1 on S3 can be suppressed out of the abovementioned predetermined range and it becomes possible to prevent over-correction processing caused by the abnormality of the temperature sensor 1.

Details of the above processing will be described by using a flowchart shown in FIG. 14. S1 and S2 that have been input into the DSP 20 are input into the correction amount arithmetic operation unit 21 and the correction amount arithmetic operation unit 21 determines the correction amount on the basis of S1 and S2. On the other hand, S2 is input into the decision unit 23 and abnormality decision of S1 is made on the basis of $S1_L$ and $S1_H$. In a case where S1 has been decided to be normal, a result that the correction amount has been added to S2 is output as S3, and in a case where S1 has been decided to be abnormal, S2 is output as S3.

The fluid measurement device that constitutes the first embodiment has the following advantages by performing the above operations. The first advantage lies in the point that in a situation that the reliability of S1 is lowered as in a case where the temperature sensor 1 has been broken and so forth, that state can be grasped by the decision unit 23. The second advantage lies in the point that in the situation that the reliability of S1 is lowered as in the case where the temperature sensor 1 has been broken and so forth, correction processing using S1 can be suppressed by the switch 24. The third advantage lies in the point that since the decision unit 23 and the switch 24 can be implemented by digital signal processing by using the DSP 20, the technique of the present invention can be applied with no addition of a large-scale circuit. The fourth advantage lies in the point that since the decision unit 23 and the switch 24 can be implemented by the digital signal processing by using the DSP 20, $S1_L$ and $S1_H$ that are decision threshold values of the decision unit 23 can be readily changed.

Figure 3:
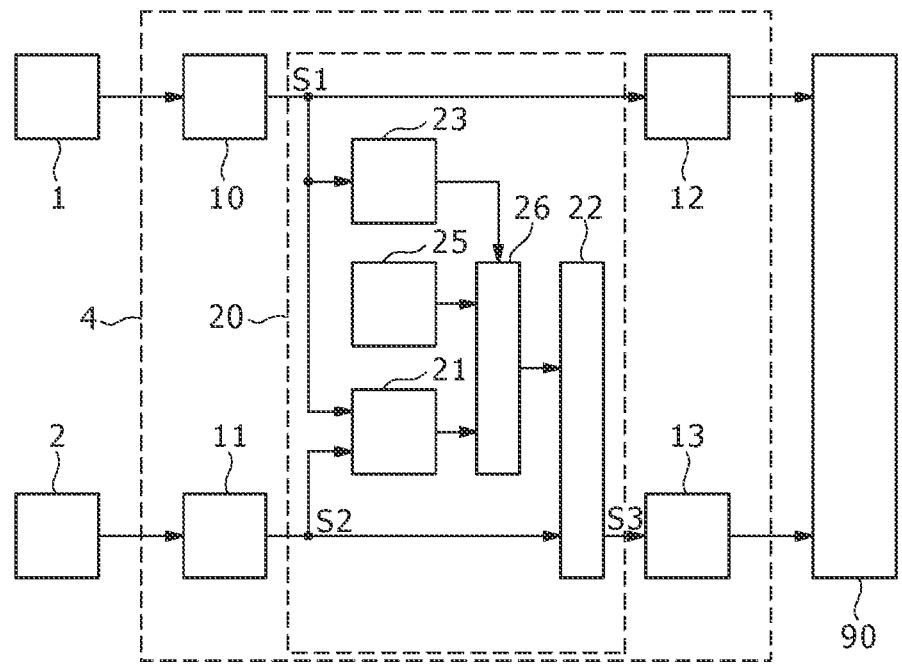
FIG. 3 is a circuit block of a fluid measurement device that constitutes a second embodiment.

Next, a second embodiment that is one embodiment of the present invention will be described by using FIG. 3. Incidentally, in the following each embodiment, the same reference numeral that has been described once in each embodiment denotes the same configuration even when its figure number is made different and has the same operational effect. Therefore, in some cases, as for the configuration that has been already described, only the reference numeral thereof is marked in the drawing and description thereof is omitted.

A fluid measurement device that constitutes the second embodiment is characterized in that a signal generator 25 that outputs a fixed value and a switch 26 provided between the correction amount arithmetic operation unit 21 and the addition unit 22 have been added, in place of the switch 24 provided on the fluid measurement device that constitutes the first embodiment. In the following, operations of the signal generator 25 and the switch 26 will be described. Incidentally, since the configurations other than the above are the same as those in the first embodiment, explanation of the operations thereof is omitted.

The switch 26 selects the output from the correction amount arithmetic operation unit 21 and the fixed value that the signal generator 25 has output in accordance with the result of decision by the decision unit 23 and transmits them to the addition unit 22. Therefore, it becomes possible to use the fixed value that the signal generator 25 has output as the correction amount in abnormality of the temperature sensor 1, and as a result, the over-correction processing caused by the abnormality of the temperature sensor 1 can be suppressed.

In addition, since the output value from the signal generator 25 can be manipulated to an optional value, it becomes possible to fix S3, the output to a value such as all 1s, all 0s and so forth. Accordingly, it becomes possible to notify the external equipment of the state by manipulating S3 in abnormality of the temperature sensor 1.

Incidentally, a predetermined signal to be generated by the signal generator 25 may be a fixed value one and may be a periodic pulse signal.

Next, advantages of the fluid measurement device that constitutes the second embodiment will be explained. The first to fourth advantages are the same as those of the fluid measurement device that constitutes the first embodiment. The fifth advantage lies in the point that notification of the state to the external equipment becomes possible in abnormality of the temperature sensor 1.

Figure 4:
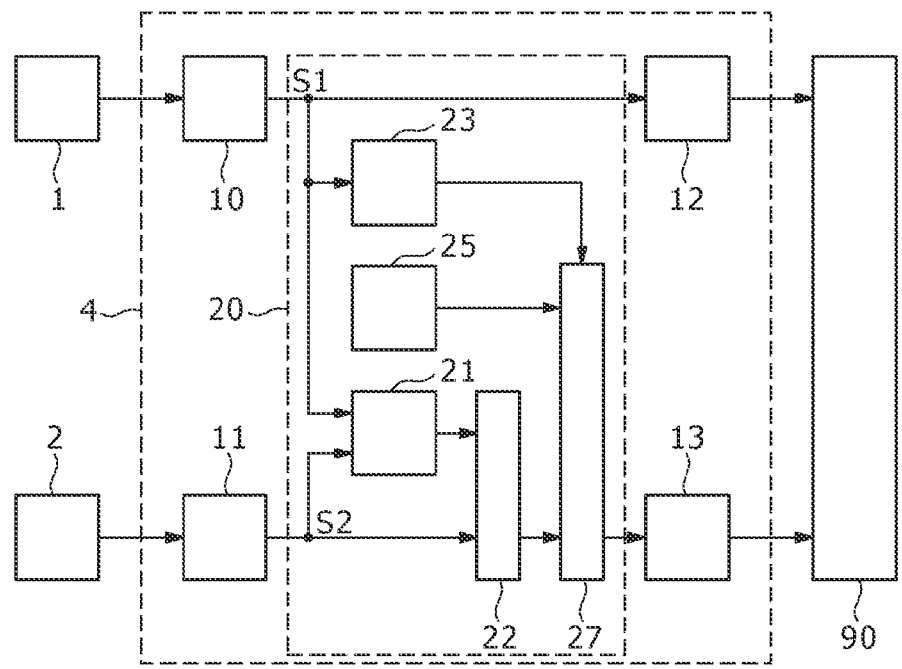
FIG. 4 is a circuit block of a fluid measurement device that constitutes a third embodiment.

Next, a third embodiment that is one embodiment of the present invention will be described by using FIG. 4.

A fluid measurement device that constitutes the third embodiment is characterized in that a switch 27 that selects the output from the signal generator 25 and the output from the addition unit 22 and transmits them to the DA converter 13 has been added, in place of the switch 26 provided on the fluid measurement device that constitutes the second embodiment. In the following, an operation of the switch 27 will be explained.

The switch 27 selects the output from the addition unit 22 and the fixed value that the signal generator 25 has output in accordance with the result of decision by the decision unit 23 and transmits them to the DA converter 13. Therefore, since the fixed value that the signal generator 25 has output can be used as S3 in abnormality of the temperature sensor 1, the optional value can be output to the external equipment in abnormality of the temperature sensor 1. That is, notification of the state to the external equipment becomes possible via S3.

Next, advantages of the fluid measurement device that constitutes the third embodiment will be described. The first to fifth advantages are the same as those of the fluid measurement device that constitutes the second embodiment. The sixth advantage lies in the point that the optional value can be output to the external equipment in abnormality of the temperature sensor 1.

Figure 5:
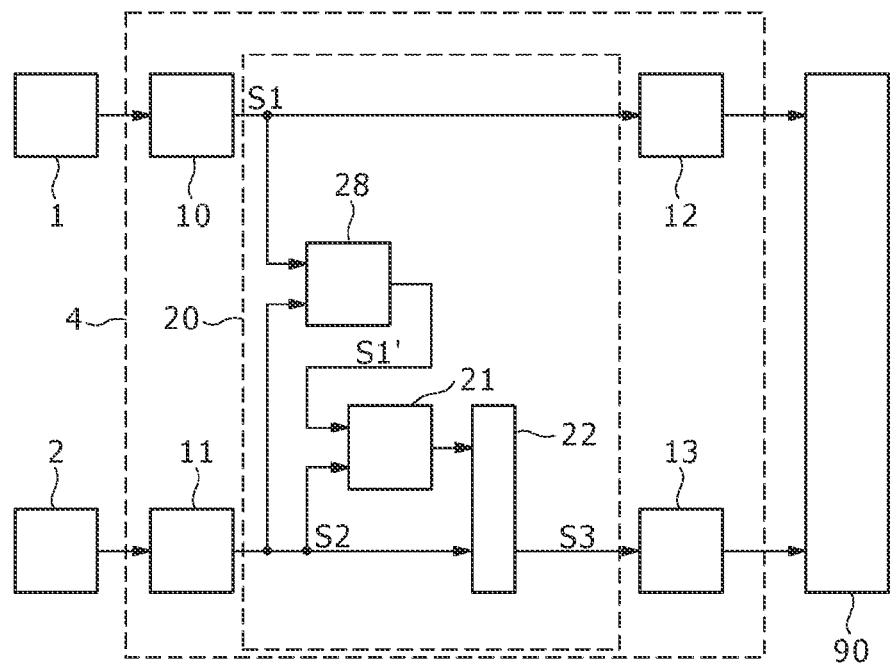
FIG. 5 is a circuit block of a fluid measurement device that constitutes a fourth embodiment.
Figure 12:
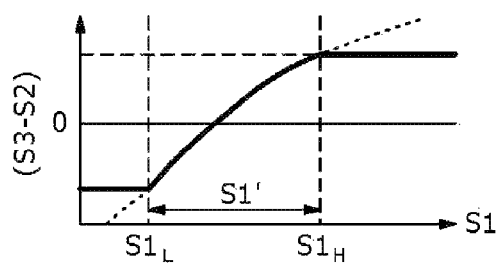
FIG. 12 is a relationship diagram of S1 with (S3−S2) of the fluid measurement device that constitutes the fourth embodiment.

Next, a fourth embodiment that is one embodiment of the present invention will be described by using FIG. 5 and FIG. 12.

A fluid measurement device that constitutes the fourth embodiment is characterized in that a limiter 28 that limits a numerical value range of S1 has been added between the AD converter 10 and the correction amount arithmetic operation unit 21, in place of the decision unit 23 and the switch 24 provided on the fluid measurement device that constitutes the first embodiment. In the following, an operation of the limiter 28 will be explained by using FIG. 12.

The limiter 28 can set a limited range $S1_L$ to $S1_H$ of S1 and limit the numerical value range of the S1 to be input into the correction amount arithmetic operation unit 21. Thereby, since a digital signal S1' that is within the abovementioned limited range is input into the correction amount arithmetic operation unit 21, the correction amount to be applied to correction can be held within a predetermined range even in a case where the value of S1 has been greatly changed caused by the abnormality of the temperature sensor 1, and therefore an error in flow rate value caused by over-correction can be reduced.

Incidentally, there are cases when a required correction amount is made different depending on the flow rate, and in these cases, there exists the limited range $S1_L$ to $S1_H$ that is suited for each flow rate. Therefore, it is preferable that the limiter 28 be capable of setting the limited range $S1_L$ to $S1_H$ in accordance with S2.

Next, advantages of the fluid measurement device that constitutes the fourth embodiment will be explained. The first advantage lies in the point that in the situation that the reliability of S1 is lowered, as in the case where the temperature sensor 1 has been broken and so forth, the error in flow rate amount caused by over-correction can be reduced by the limiter 28. The second advantage lies in the point that since the limiter 28 can be implemented by the digital signal processing by using the DSP 20, the technique of the present invention can be applied with no addition of the large-scale circuit. The third advantage lies in the point that since the limiter 28 can be implemented by the digital signal processing by using the DSP 20, the limited range of the limiter 28 can be readily changed.

Figure 6:
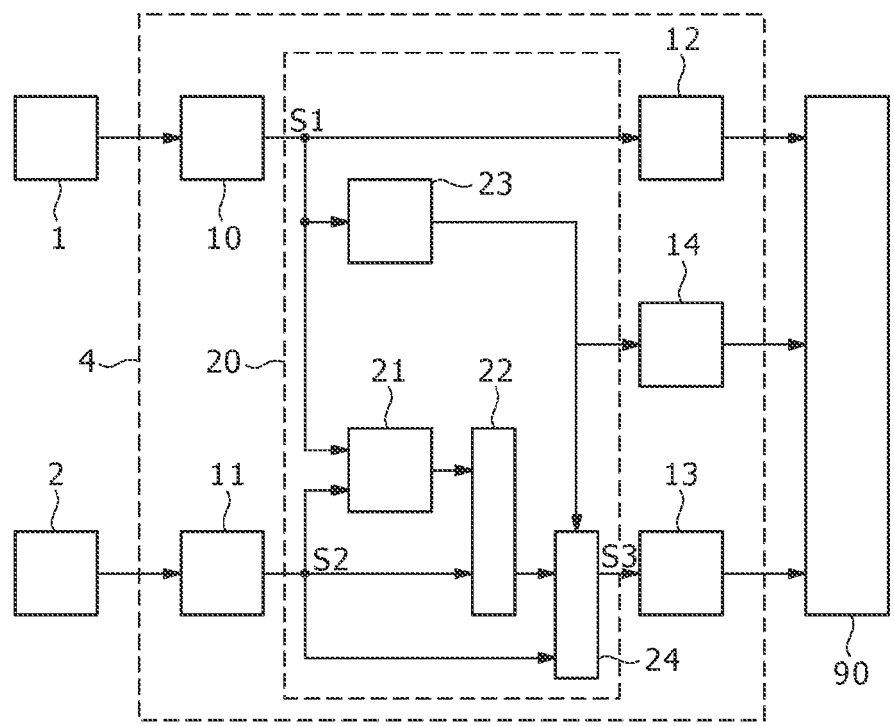
FIG. 6 is a circuit block of a fluid measurement device that constitutes a first modified example.

Next, a first modified example of the first embodiment will be described by using FIG. 6.

A fluid measurement device that constitutes the first modified example is characterized in that a DA converter 14 that converts the result of decision by the decision unit 23 provided on the fluid measurement device that constitutes the first embodiment into an analog signal has been added, thereby making it possible to transmit the result of decision by the decision unit 23 directly to the ECU 90. Thereby, the abnormality of the temperature sensor 1 can be determined by the ECU 90.

Figure 7:
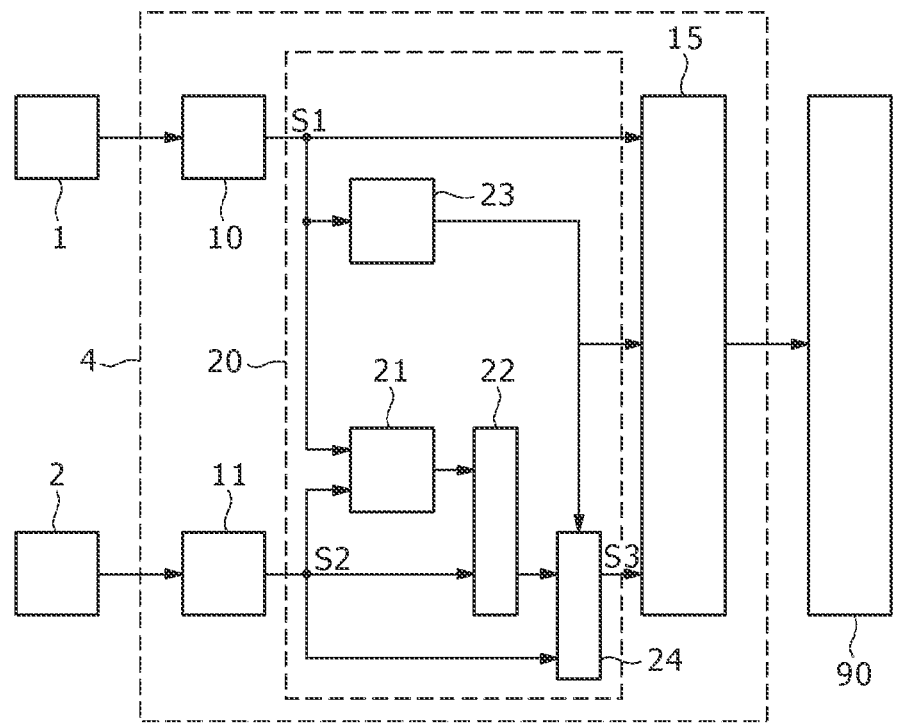
FIG. 7 is a circuit block of a fluid measurement device that constitutes a second modified example.

Next, a second modified example of the first embodiment will be described by using FIG. 7.

A fluid measurement device that constitutes the second modified example is characterized in that a communication interface 15 has been added in place of the DA converter 12 and the DA converter 13 provided on the fluid measurement device that constitutes the first embodiment, thereby making it possible to digitally output a signal of the result of decision by the decision unit 23 together with S1 and S3. Thereby, a plurality of pieces of detection information can be transmitted to the ECU 90 over a single digital communication bus.

Figure 8:
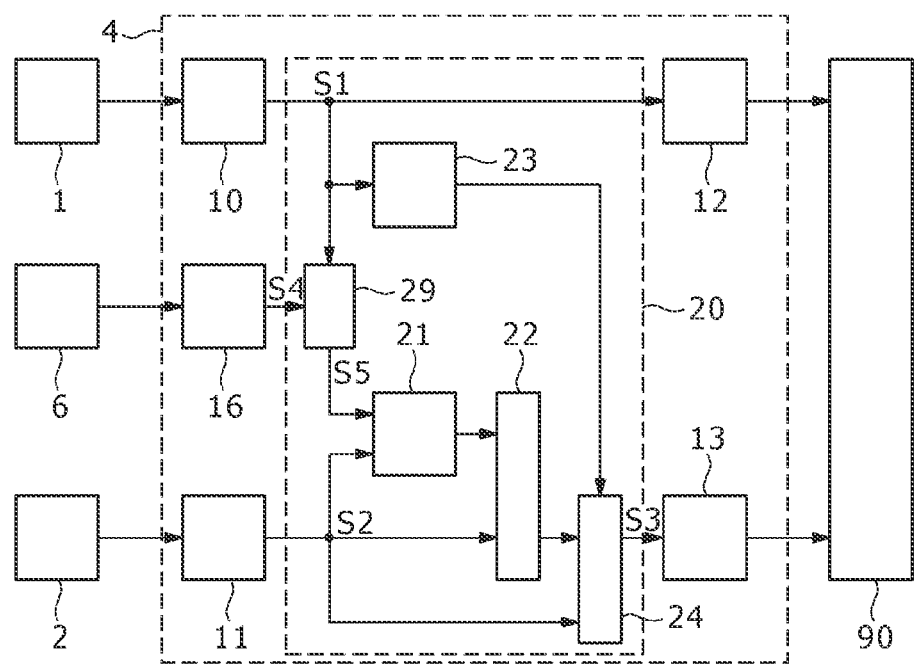
FIG. 8 is a circuit block of a fluid measurement device that constitutes a third modified example.

Next, a third modified example of the first embodiment will be described by using FIG. 8.

A fluid measurement device that constitutes the third modified example is characterized in that a temperature sensor 6, an AD converter 16 that digitally converts the output from the temperature sensor 6 and an arithmetic operation unit 29 that outputs a differential signal S5 between a digital signal S4 that the AD converter 16 outputs and S1 are added to the fluid measurement device that constitutes the first embodiment, and the correction amount arithmetic operation unit 21 derives the correction amount on the basis of the S2 and S5.

Also in the fluid measurement device that constitutes the third modified example, since S1 is changed in abnormality of the temperature sensor 1, S5 that is the differential signal between S1 and S4 is also changed. Therefore, in a case where correction has been made with the correction amount according to S5, there is a risk that an over-correction error may occur. Even in this case, it is possible to suppress the over-correction error by deciding S1 by the decision unit 23 and operating the switch 24 in accordance with the result of decision similarly to the first embodiment.

Incidentally, it is preferable that a decision unit that decides S4 be added to the fluid measurement device that constitutes the third modified example so as to configure that the switch 24 is operated in a case where either one of S1 and S4 has been decided to be abnormal. Thereby, it becomes possible to assure more excellent reliability.

Figure 9:
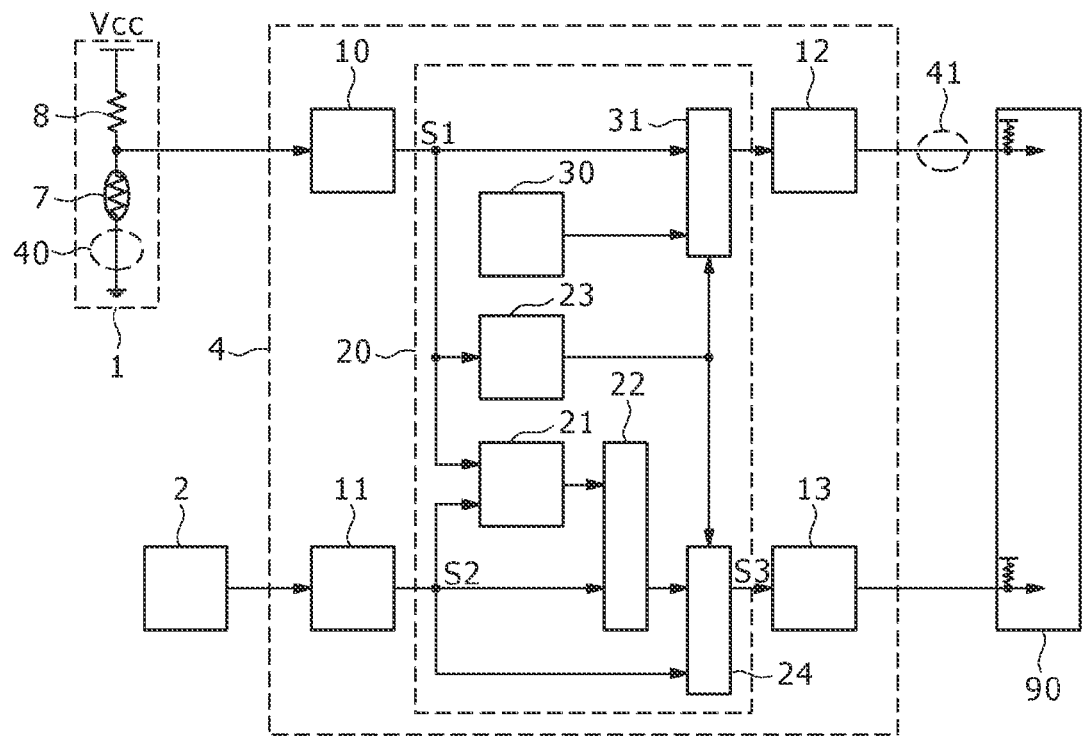
FIG. 9 is a circuit block of a fluid measurement device that constitutes a fourth modified example.

Next, a fourth modified example of the first embodiment will be described by using FIG. 9 and FIG. 13.

A fluid measurement device that constitutes the fourth modified example is characterized in that a signal generator 30 and a switch 31 that selects either the output from the signal generator 30 or S1 in accordance with the result of decision by the decision unit 23 and inputs it into the DA converter 12 have been added to the fluid measurement device that constitutes the first embodiment. Thereby, it becomes possible to output a predetermined signal generated by the signal generator 30 to the ECU 90 via the DA converter 12 in place of S1 in abnormality of the temperature sensor 1. Incidentally, the predetermined signal to be generated by the signal generator 30 may be a fixed value one and may be a periodic pulse signal.

Advantages of the fourth modified example will be explained by using FIG. 13. FIG. 13 shows a configuration that in a case where the fluid measurement device and the ECU 90 have been combined with each other, the abnormality of the temperature sensor 1 is decided on the ECU 90 side. That is, it is the configuration not having state decision means for the temperature sensor 1 in a sensor device 5. The detection signal of the temperature sensor 1 that is output from the circuit element 4 is input into the ECU 90 via a harness 41 and is input into a decision unit. 94 provided on the ECU 90 to decide the abnormality. The ECU 90 is provided with switches 91 and 92 at the front stage that the detection signals of the temperature sensor 1 and the flow sensor 2 that are output from the circuit element 4 are input into a signal processing unit 93 and performs intermittent control in accordance with a result of decision by the decision unit 94.

Figure 13:
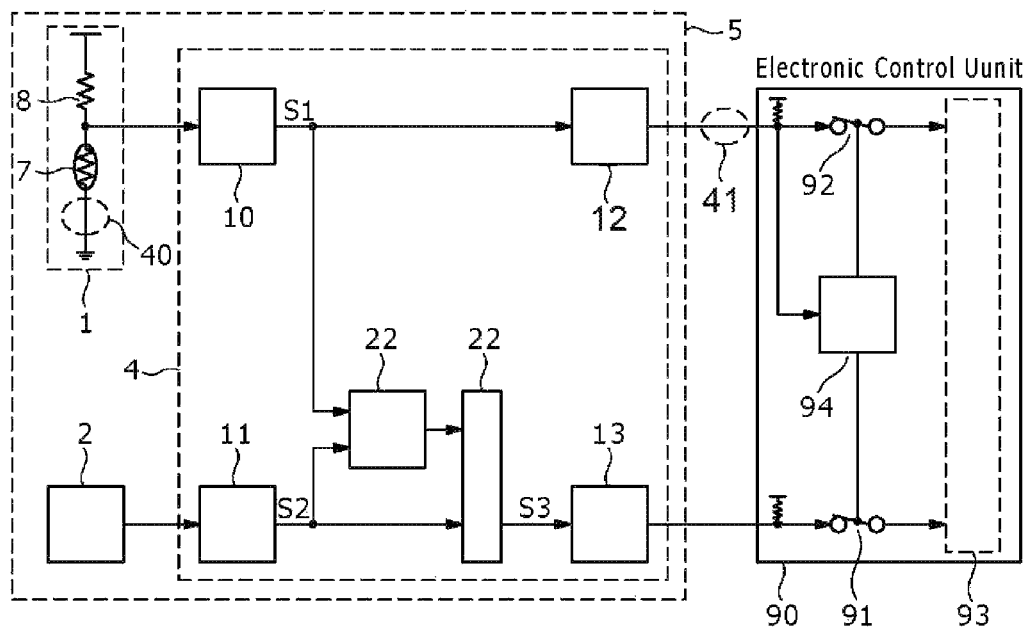
FIG. 13 is a configuration example of a system including a fluid measurement device, and an ECU.

However, in the configuration shown in FIG. 13, a failure mode that the wiring 40 that grounds the thermistor 7 that configures the temperature sensor 1 is disconnected cannot be discriminated from a failure mode that the harness 41 that transmits the detection signal of the temperature sensor 1 to the ECU 90 is disconnected. This is because both of the thermistor 7 and the harness 41 are connected to a power source via a pull-up resistor and therefore a signal to be input into the ECU 90 is fixed to a value in the vicinity of the power source potential regardless of which one has been disconnected. Accordingly, the decision unit 94 decides that the temperature sensor 1 has been broken even regardless of which one of the wiring 40 and the harness 41 has been broken, and interrupts the signal by the switches 91 and 92.

On the other hand, in the fourth modified example, the periodic pulse signal that has been generated by the signal generator 30 can be output to the ECU 90 via the switch 31 in abnormality of the temperature sensor 1. Therefore, the first advantage of the fluid measurement device that constitutes the fourth modified example lies in the point that it becomes possible to discriminate the case where the temperature sensor 1 has been broken from the case where the harness 41 has been disconnected. In addition, in a case of the failure mode that the harness 41 is disconnected, the DSP 20 is appropriately performing a correcting operation. Therefore, the second advantage lies in the point that the detection signal of the flow sensor 2 can be utilized in the ECU 90 even in the case of the failure mode that the harness 41 is disconnected.

Although in the above-cited embodiments, the operations regarding a case where the output from the flow sensor is corrected with the output from the temperature sensor have been explained, it is also applicable to a case where the output from the flow sensor is to be corrected with an output from a pressure sensor and a case where an output from a humidity sensor is to be corrected with the output from the temperature sensor. In addition, a combination of the temperature sensors may be allowed and it is not limited to combinations of the sensors that have been cited in the embodiments.

REFERENCE SIGNS LIST 1, 6: temperature sensor
2: flow sensor
3: support
4: circuit element
5: sensor device
7: thermistor
8: fixed resistor
10, 11, 16: AD converter
12 to 14: DA converter
15: communication interface
20: digital signal processor (DSP)
21: correction amount arithmetic operation unit
22: addition unit
23: decision unit
24, 26, 27, 31, 91, 92: switch
25, 30: signal generator
28: limiter
29: arithmetic operation unit
40: wiring
41: harness
90: ECU
93: signal processing unit
94: decision unit
100: piping
101: main passage
102: casing
103: sub-passage 200: main fluid
201: tributary fluid

The invention claimed is:

1. A fluid measurement device, having a circuit unit into which a first signal output from a first detection element and a second signal output from a second detection element are input,
wherein the circuit unit includes:
signal processing means that outputs a third signal in accordance with the first signal and the second signal;
state deciding means that determine whether a state of the first signal is within a predetermined range; and
control means that controls an amount of change that a change of the first signal imparts to the third signal in accordance with a result of decision by the state deciding means that determines that the state of the first signal is not within the predetermined range, wherein the predetermined range is based on the second signal.

2. The fluid measurement device according to claim 1, wherein the control means:
controls the amount of change to be imparted to the third signal such that a correlation coefficient of an amount of change of the first signal with an amount of change in difference between the second signal and the third signal enters into such a relationship as to change constantly or continuously, within a range indicating that the first signal is in a normal state in the result of decision by the state deciding means; and
controls the amount of change to be imparted to the third signal such that the correlation coefficient of the amount of change of the first signal with the amount of change in difference between the second signal and the third signal changes discontinuously, out of the range indicating that the first signal is in the normal state in the result of decision by the state deciding means.

3. The fluid measurement device according to claim 1, wherein the control means is provided with means that sets an upper limit to the amount of change that the change of the first signal imparts to the third signal.

4. The fluid measurement device according to claim 1, wherein the control means is provided with means that sets a lower limit to the amount of change that the change of the first signal imparts to the third signal.

5. The fluid measurement device according to claim 1, wherein the control means is provided with means that sets an upper limit and a lower limit to the amount of change that the change of the first signal imparts to the third signal.

6. The fluid measurement device according to claim 1, wherein the control means is provided with invalidation means that reduces to zero the amount of change that the change of the first signal imparts to the third signal.

7. The fluid measurement device according to claim 6, wherein the invalidation means is provided with means that sets the second signal as the third signal.

8. The fluid measurement device according to claim 6, wherein the invalidation means is provided with means that sets a predetermined value as the third signal.

9. The fluid measurement device according to claim 1, comprising notification means that notifies the outside of the result of decision by the state deciding means.

10. The fluid measurement device according to claim 9, wherein the notification means is provided with predetermined communication means.

11. The fluid measurement device according to claim 1, wherein the first detection element is an element that detects a temperature of a fluid, and
the second detection element is an element that detects a flow rate of the fluid.

* * * * *